(12) United States Patent
Ngu

(10) Patent No.: US 9,644,385 B2
(45) Date of Patent: May 9, 2017

(54) ADJUSTABLE UMBRELLA BASE

(71) Applicant: Hao Thu Ngu, Draper, UT (US)

(72) Inventor: Hao Thu Ngu, Draper, UT (US)

( * ) Notice: Subject to any disclaimer, the term of this patent is extended or adjusted under 35 U.S.C. 154(b) by 0 days.

(21) Appl. No.: 15/018,543

(22) Filed: Feb. 8, 2016

(65) Prior Publication Data

US 2016/0208509 A1    Jul. 21, 2016

Related U.S. Application Data

(63) Continuation-in-part of application No. 15/000,229, filed on Jan. 19, 2016, now abandoned.

(60) Provisional application No. 62/105,491, filed on Jan. 20, 2015.

(51) Int. Cl.
| | |
|---|---|
| *F16M 13/00* | (2006.01) |
| *E04H 12/22* | (2006.01) |
| *A45F 3/44* | (2006.01) |
| *A45B 17/00* | (2006.01) |
| *F16M 11/14* | (2006.01) |
| *A45B 23/00* | (2006.01) |

(52) U.S. Cl.
CPC ......... *E04H 12/2284* (2013.01); *A45B 17/00* (2013.01); *A45F 3/44* (2013.01); *E04H 12/2238* (2013.01); *A45B 2017/005* (2013.01); *A45B 2023/0012* (2013.01); *F16M 11/14* (2013.01); *F16M 2200/041* (2013.01)

(58) Field of Classification Search
CPC ....... E04H 12/2238; F16M 11/14; A45F 3/44; A45B 2200/109
USPC ........ 248/181.2, 288.51, 514–516, 156, 530; 135/98, 20.1
See application file for complete search history.

(56) References Cited

U.S. PATENT DOCUMENTS

| | | | | |
|---|---|---|---|---|
| 2,694,538 A | * | 11/1954 | Consolo | A01K 97/10 248/182.1 |
| 2,806,289 A | * | 9/1957 | Rongaus | F41G 11/00 248/182.1 |
| 3,290,816 A | * | 12/1966 | Eklof | A01K 97/10 248/516 |
| 5,280,871 A | * | 1/1994 | Chuang | A45B 17/00 248/181.1 |

* cited by examiner

*Primary Examiner* — Gwendolyn Baxter
(74) *Attorney, Agent, or Firm* — TraskBritt

(57) ABSTRACT

An umbrella stand may include a receptacle for receiving a portion of a mast of an umbrella and a base portion configured to interface with a ground surface. A movable joint is disposed between the receptacle and the base portion. A frictional force present between components of the movable joint is great enough to maintain a position of the receptacle relative to the base portion under the weight of the umbrella and mast, and is small enough that the receptacle can be repositioned relative to the base portion by application of a manual force to the mast of the umbrella. The movable joint may be lockable into different positions.

16 Claims, 3 Drawing Sheets

ADJUSTABLE UMBRELLA BASE

PRIORITY CLAIM

This application is a continuation-in-part of U.S. patent application Ser. No. 15/000,229, filed Jan. 19, 2016, for "Adjustable Umbrella Base," now abandoned, which is a utility conversion of U.S. Provisional Patent Application Ser. No. 62/105,491, filed Jan. 20, 2015, the disclosure of each of which is hereby incorporated herein in its entirety by this reference.

TECHNICAL FIELD

Embodiments of the present disclosure relate generally to stands for umbrellas.

BACKGROUND

Temporary shade from the sun, or protection from rain or snow, may be needed for spectators or other participants in situations such as outdoor recreational activities like sports games, outdoor concerts, etc. Such protection may be provided by an umbrella including, for example, a fabric canopy supported by a folding frame of metal or polymer spars. The folding frame may be connected to a mast, and the mast may be retained in a stationary stand placed on or in the ground. As the angle of the sun in the sky changes throughout the day, the area of shade provided by the umbrella may move across the ground, making it necessary to reposition the stand to a different location or orientation. This may create significant inconvenience and potentially interrupt the participants' enjoyment of the activity.

BRIEF SUMMARY

In one embodiment, an umbrella stand includes a receptacle for receiving a portion of a mast of an umbrella, and a base portion configured to interface with a ground surface. A movable joint is disposed between the receptacle and the base portion. A frictional force present between components of the movable joint is great enough to maintain a position of the receptacle relative to the base portion under the weight of the umbrella and mast, and is small enough that the receptacle can be repositioned relative to the base portion by application of a manual force to the mast of the umbrella.

In another embodiment, an umbrella stand includes a receptacle for receiving a portion of a mast of an umbrella, a base portion configured to interface with a ground surface, and a movable joint disposed between and connected to the receptacle and to the base portion. The movable joint includes a ball, a socket sleeve with a socket surface against which a surface of the ball bears, and a spring disposed between a spring seat of the base portion and the ball.

DETAILED DESCRIPTION

The illustrations presented herein are not meant to be actual views of any particular device, but are merely idealized representations, which are employed to describe example embodiments of the present disclosure.

Figure 1:
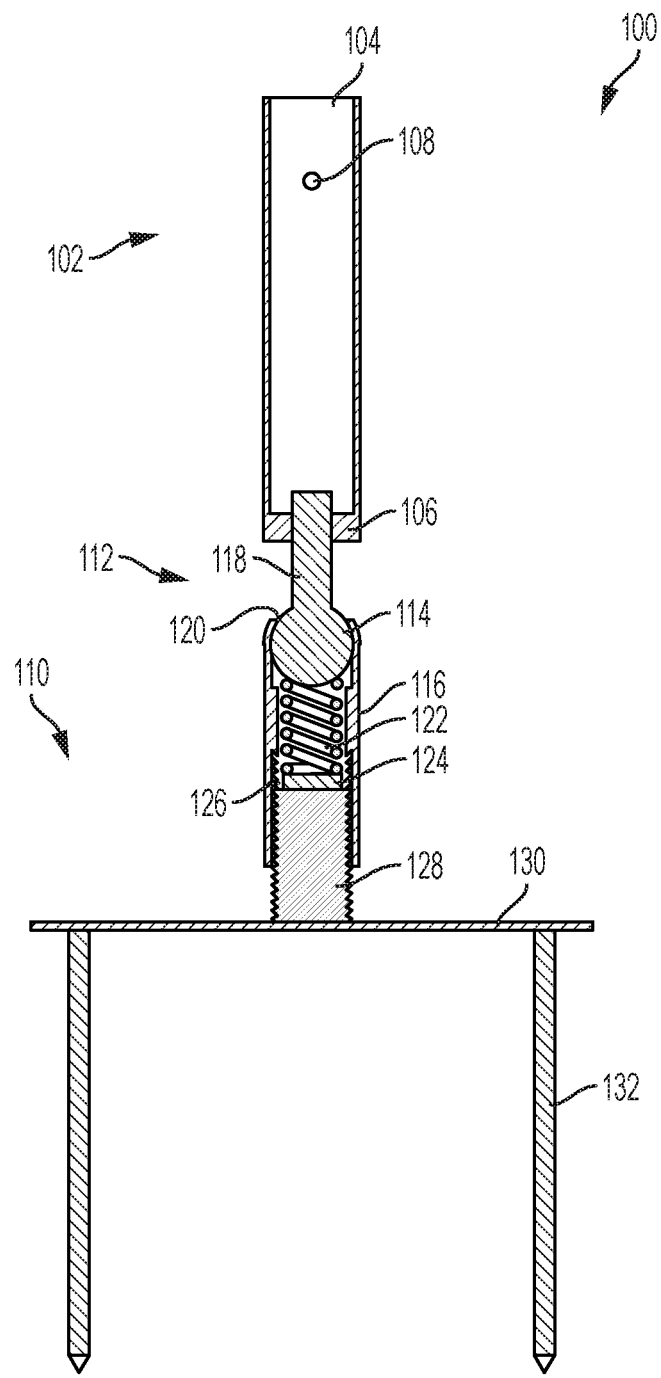
FIG. 1 is a side cross-sectional view of an umbrella stand according to an embodiment of the present disclosure.

FIG. 1 is a cross-sectional view of an adjustable umbrella stand 100 according to the present disclosure. The adjustable umbrella stand 100 may include a receptacle 102 configured to support a mast of an umbrella (not shown). The receptacle 102 may have any suitable configuration for retaining (e.g., gripping, holding) the umbrella mast. For example, as shown in FIG. 1, the receptacle 102 may have a tubular shape with an open end 104 and a closed end 106. An end portion of the umbrella mast may be placed in the open end 104 and inserted until the end portion of the mast rests upon the interior of the closed end 106 of the receptacle 102. The mast may be retained within the receptacle 102 by tightening a set screw (e.g., wing bolt) within a set screw bore 108. The receptacle 102 may comprise materials such as steel, aluminum, polymers, composite materials, etc.

The receptacle 102 may be connected to a base portion 110 of the umbrella stand 100 by a movable joint 112. The movable joint 112 may be configured to maintain a position of the receptacle 102 relative to the base portion 110 under loads exerted by the weight of the umbrella and mast when the umbrella and mast are retained within the receptacle 102, while allowing movement (e.g., pivoting) of the receptacle 102 with respect to the base portion 110 when an additional force is applied. For example, a friction force within the movable joint 112 may maintain a given position of the receptacle 102 and umbrella with respect to the base portion 110. Application of an additional force to the receptacle 102 (e.g., by a user manually manipulating the mast of the umbrella) may overcome the frictional force and the receptacle 102 may pivot with respect to the base portion 110 through movement in the movable joint 112. When the umbrella reaches the position desired by the user through movement of the movable joint 112, the user may cease application of manual force, and the frictional forces within the movable joint 119 may maintain the receptacle 102 and umbrella in the new position relative to the base portion 110.

In some embodiments, the movable joint 112 may be a spherical joint (i.e., a ball-and-socket joint) capable of angular deviation from a vertical orientation (i.e., the orientation shown in FIG. 1) and rotation around 360° with respect to a horizontal plane (e.g., a horizontal plane extending into the plane of FIG. 1). For example, with continued reference to FIG. 1, the movable joint 112 may include a ball 114 disposed partially within a socket sleeve 116 of the base portion 110. The ball 114 may have a stem 118 connected to (e.g., welded, threaded, formed integrally with) the receptacle 102. The socket sleeve 116 may include a socket surface 120 against which a portion of the ball 114 may bear. The umbrella stand 100 may include components configured to apply force to the ball 114, urging the ball 114 into contact with the socket surface 120 with sufficient force so that friction between the ball 114 and the socket surface 120 maintains the receptacle 102 in a fixed position with respect to the base portion 110. Application of manual force to the umbrella or umbrella mast may overcome the frictional force between the ball 114 and the socket surface 120, allowing repositioning of the umbrella mast and umbrella as described above.

In some embodiments, the socket surface 120 may comprise a bushing inserted within the socket sleeve 116. The ball 114 and the socket sleeve 116 may comprise materials such as steel, aluminum, brass, polymer materials, composite materials, or other materials.

For example, a spring 122 may be disposed within the socket sleeve 116 and configured to exert a force on the ball 114, urging the ball 114 into contact with the socket surface 120. The spring 122 may be disposed between a spring seat 124 and the ball 114. In some embodiments, a ball seat (e.g., a bushing) may be disposed between the spring 122 and the ball 114. As a non-limiting example, the spring 122 may be a compression coil spring, as shown in FIG. 1. In other embodiments, the spring 122 may comprise different configurations, such as one or more Bellville springs, leaf springs, etc., comprising materials such as steel, elastomeric materials, etc. The spring 122 may be in a partially compressed state when assembled within the socket sleeve 116. The force applied to the ball 114 by the spring 122 may be determined by the degree to which the spring 122 is compressed between the spring seat 124 and the ball 114 and the spring rate of the spring 122.

In some embodiments, the amount of force exerted by the spring 122 on the ball 114 may be adjustable. For example, in the embodiment shown in FIG. 1, the socket sleeve 116 may include a threaded bore 126 into which a complementary threaded post 128 of the base portion 110 is inserted. The spring seat 124 may rest on, be attached to, or be formed integrally with the threaded post 128. As the socket sleeve 116 is threaded further onto the threaded post 128, the distance between the spring seat 124 and the ball 114 is reduced, thereby compressing the spring 122 and increasing the force exerted by the spring on the ball 114. In this manner, the frictional force present between the ball 114 and the socket surface 120 may be altered by rotating the socket sleeve 116 relative to the threaded post 128. Thus, the frictional force may be increased when desired, e.g., when forces from wind or incidental contact may cause undesirable movement of the umbrella and mast, or reduced when desired, e.g., to reduce the manual force necessary to reposition the receptacle 102 and the umbrella.

The base portion 110 may include a base plate 130. The base plate 130 may include, for example, one or more stakes 132 configured to be driven into the ground (e.g., natural turf and soil) to hold the base plate 130 in position. In the embodiment shown in FIG. 1, the base plate 130 may include two stakes 132 and have an elongate shape in a horizontal plane orthogonal to the plane of FIG. 1. In other embodiments, the base plate 130 may have a square, triangular, or other shape, and may have more than two stakes 132, or may only have one stake 132. In some embodiments, the base plate 130 may comprise a metal alloy such as steel, and the stakes 132 may comprise a similar or identical material. The stakes 132 may be welded or otherwise affixed to the base plate 130.

Figure 2:
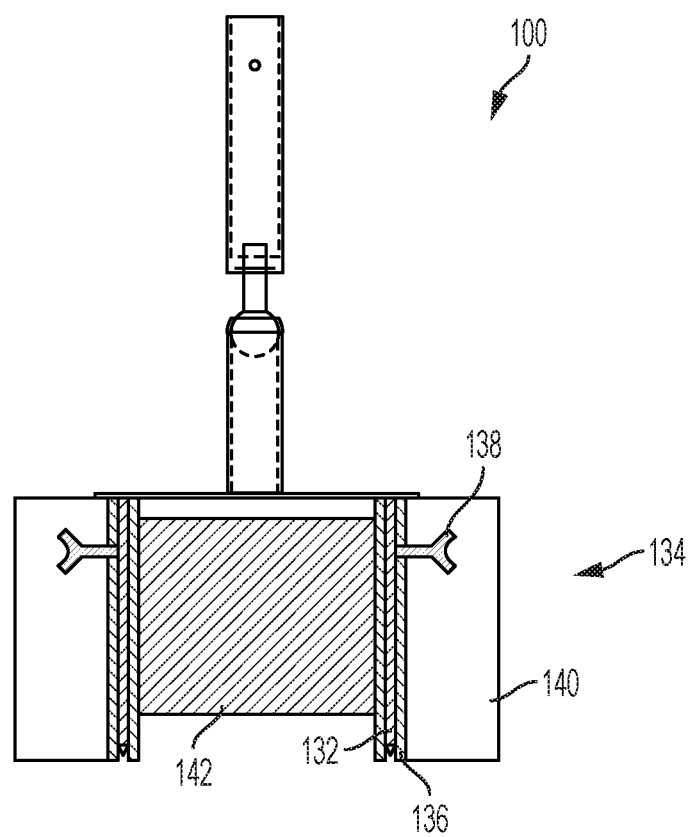
FIG. 2 is a partial side cross-sectional view of the umbrella stand of FIG. 1 and an embodiment of a freestanding base.

In some situations, it may be desired to deploy the umbrella stand 100 over a surface into which the stakes 132 cannot be driven or which would not provide adequate support for the umbrella stand 100, (e.g., loose sand). Accordingly, with reference now to FIGS. 2 and 3, the umbrella stand 100 may include a freestanding base 134 with sleeves 136 into which the stakes 132 may be inserted. Set screws 138 (e.g., wing bolts) may be tightened against the stakes 132 to retain the umbrella stand 100 within the freestanding base 134. The freestanding base 134 may include spars 140 extending from the sleeves 136 into which the stakes 132 are inserted. The sleeves 136 may comprise tubing made from materials such as steel, aluminum, other metals, polymers, or other materials. In one embodiment, the sleeves 136 and spars 140 may comprise steel, and may be welded together to form the freestanding base 134. In the embodiment shown in FIG. 2, a central web 142 may attach the sleeves 136 to one another. In other embodiments, the sleeves 136 may not be attached to one another.

Figure 3:
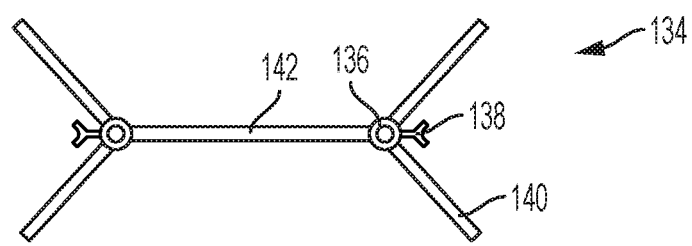
FIG. 3 is a top view of the freestanding base of the embodiment of FIG. 2.

The spars 140 of the freestanding base 134 may extend outward from the sleeves 136 at angles chosen to provide a footprint contact with the ground large enough to impart stability to the umbrella stand 100 and attached umbrella, as shown in FIG. 3. Other embodiments may include more or fewer spars 140 than the embodiment shown in FIGS. 2 and 3, and the spars may be oriented differently. Furthermore, the freestanding base 134 may be at least partially driven into soft ground such as sand that would not otherwise support the umbrella stand 100.

Figure 4:
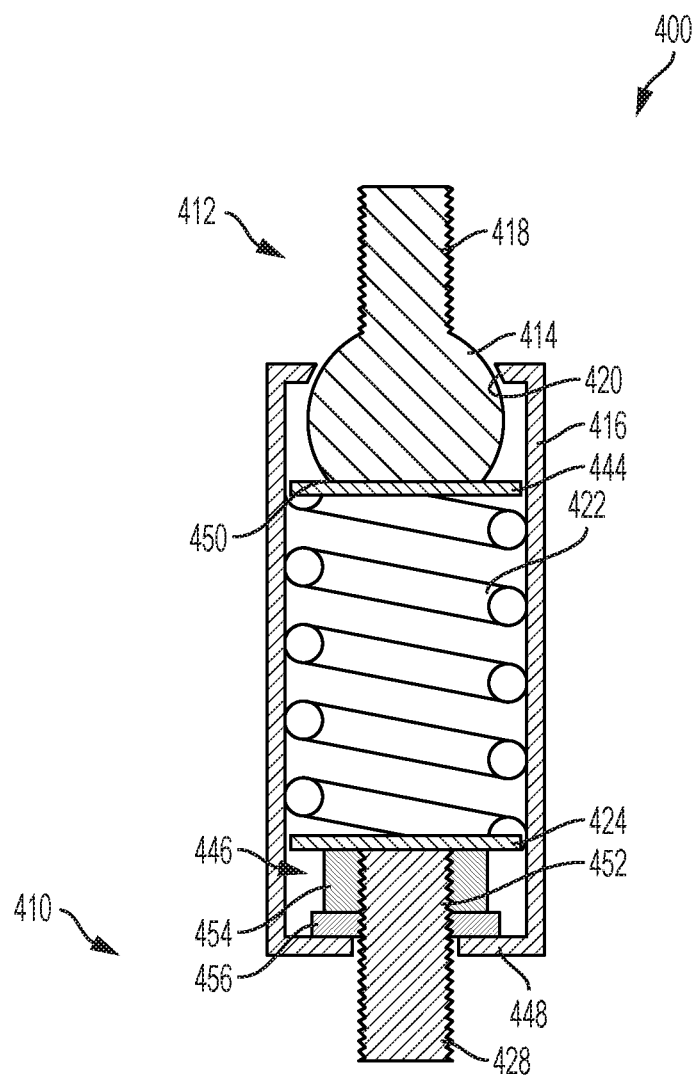
FIG. 4 is an enlarged cross-sectional view of an umbrella stand according to an embodiment of the present disclosure.

FIG. 4 is an enlarged cross-sectional view of an adjustable umbrella stand 400 according to another embodiment of the present disclosure. Some portions of the adjustable umbrella stand 400 are removed for clarity. Similar to the adjustable umbrella stand 100 of FIG. 1, the adjustable umbrella stand 400 may include a movable joint 412, a base portion 410, a spring 422, and a spring seat 424. The movable joint 412 may include a ball 414 and a stem 418. The base portion 410 may include a socket sleeve 416 having a socket surface 420 and a threaded post 428. The elements of the adjustable umbrella stand 400 may be oriented in the same manner described in regard to FIG. 1. However, the movable joint 412 of the adjustable umbrella stand 400 may include a ball seat 444, and the base portion 410 may include support member 446. Furthermore, the socket sleeve 416 may include a lower external wall 448 through which a threaded post 428 extends.

The ball seat 444 may be disposed between the ball 414 of the movable joint 412 and the spring 422. In some embodiments, the ball seat 444 may include a plate (e.g., disc, washer, etc.) upon which the ball 414 may bear. Furthermore, the ball 414 may have a flat surface 450 that bears against the ball seat 444. The flat surface 450 of the ball 414 may be on a side of the ball 414 opposite the stem 418 of the ball 414. In other words, the ball 414 may have a general dome shape with the stem 418 extending from a top of the dome.

The spring 422 may press the ball seat 444 up against the ball 414. In some embodiments, the flat surface 450 of the ball 414 may enable the movable joint 412 of the adjustable umbrella stand 400 to be locked in a position wherein a central longitudinal axis of the stem 418 of the movable joint 412 is collinear with a central longitudinal axis of the threaded post 428 of the base portion 410. In other words, the flat surface 450 of the ball 414 may enable the movable joint 412 of the adjustable umbrella stand 400 to be locked in straight up position (e.g., a position where a longitudinal length of the receptacle 102 (FIG. 1) is orthogonal to a top surface of the base plate 130 (FIG. 1)). For example, in a straight up position, the flat surface 450 of the ball 414 may be oriented parallel to a top surface of the ball seat 444 and may be bearing against the ball seat 444.

Having the flat surface 450 of the ball 414 bearing against the ball seat 444 may help to prevent the ball 414 from moving (e.g., rotating relative to the ball seat 444) unintentionally (e.g., falling out of place). As a result, the adjustable umbrella stand 400 may be able to maintain a position of the movable joint 412 even when an umbrella mast or umbrella held by the adjustable umbrella stand 400 is subjected to external forces (e.g., wind). However, because the ball 414 has a general dome shape, the movable joint 412 may still be capable of angular deviation from a vertical position (e.g., the orientation shown in FIG. 4) and rotation around 360° relative to a horizontal plane (e.g., a horizontal plane extending into the plane of FIG. 4), as described above in regard to FIG. 1. As a result, while the adjustable umbrella stand 400 may have a lockable position due to the flat surface 450 of the ball 414, the adjustable umbrella stand may still be repositioned as described above in regard to FIG. 1.

The support member 446 may be disposed between the spring 422 and the lower external wall 448 of the socket sleeve 416, and may be disposed on a side of the spring 422 opposite the ball seat 444. The support member 446 may support the spring seat 424 and may maintain an orientation of the spring seat 424. In other words, the support member 446 may keep the spring seat 424 from becoming displaced relative to the spring 422 within the socket sleeve 416 of the base portion 410.

In some embodiments, the support member 446 may include a threaded borehole 452 into which the threaded post 428 may be inserted. In other words, the support member 446 may at least partially replace the threaded bore 126 of the socket sleeve 116 shown in FIG. 1. In some embodiments, the support member 446 may be attached to (e.g., fixed to) the lower external wall 448. In some embodiments, the support member 446 may include a first portion 454 and a second portion 456. The first portion 454 may be fixed relative to the threaded post 428 and may abut up against the spring seat 424. The second portion 456 may include the threaded borehole 452 and may be disposed between the first portion 454 and the lower external wall 448 of the socket sleeve 416. The second portion 456 may be fixed relative to the socket sleeve 416. In some embodiments, both the first portion 454 and the second portion 456 may be fixed relative to the socket sleeve 416. In such embodiments, the threaded post 428 may be threaded through the threaded borehole 452 of the support member 446 and may be caused to press up against the spring seat 424 by further threading the threaded post 428 through the threaded borehole 452. In the same manner discussed above in regard to FIG. 1, a frictional force present between the ball 414 and the socket surface 420 and a frictional force present between the ball 414 and the ball seat 444 may be increased by threading the socket sleeve 416, and as a result, the support member 446 further onto the threaded post 428 and compressing the spring 422.

Referring to FIG. 1, in some embodiments, the base plate 130 may have a generally flat contour when viewed in a cross-sectional view in a plane perpendicular to the plane of FIG. 1 and extending along a central longitudinal axis of the adjustable umbrella stand 100. In other embodiments, the base plate 130 may have a curved contour or non-flat contour. Furthermore, the threaded post 128, base plate 130, and stakes 132 may be exchangeable with other elements to accommodate different terrains. For example, the threaded post 128, base plate 130, and stakes 132 may be exchangeable to accommodate sand, rocks, dirt, mud, gravels, cement, etc.

While certain illustrative embodiments have been described in connection with the figures, those of ordinary skill in the art will recognize and appreciate that the scope of this disclosure is not limited to those embodiments explicitly shown and described herein. Rather, many additions, deletions, and modifications to the embodiments described herein may be made to produce embodiments within the scope of this disclosure, such as those hereinafter claimed, including legal equivalents. In addition, features from one disclosed embodiment may be combined with features of another disclosed embodiment while still being within the scope of this disclosure, as contemplated by the inventor.

What is claimed is:

1. An umbrella assembly, comprising:
an umbrella including a mast; and
an umbrella stand, the umbrella stand comprising:
a receptacle receiving a portion of the mast of the umbrella;
a base portion configured to interface with a ground surface; and
a movable joint disposed between the receptacle and the base portion, the movable joint comprising:
a socket sleeve with a socket surface against which a surface of the ball bears;
a ball disposed at least partially within the socket sleeve, the ball having a flat surface on one end thereof and a stem on an opposite end thereof;
a ball seat disposed within the socket sleeve and adjacent to the flat surface of the ball; and
a spring disposed within a socket sleeve and adjacent to the ball seat on a side of the ball seat opposite the ball;
wherein a frictional force present between components of the movable joint is great enough to maintain a position of the receptacle relative to the base portion under the weight of the umbrella and the mast, and is small enough that the receptacle can be repositioned relative to the base portion by application of a manual force to the mast of the umbrella.

2. The umbrella stand of claim 1, wherein the movable joint comprises a ball and socket joint and the frictional force comprises a frictional force between the ball and the socket surface.

3. The umbrella stand of claim 2, wherein the base portion comprises a spring configured to apply force to the ball seat urging the ball into contact with the socket surface.

4. The umbrella stand of claim 3, wherein the spring is disposed between a spring seat and the ball seat.

5. The umbrella stand of claim 4, wherein the socket surface is disposed in a socket sleeve, and the socket sleeve comprises a threaded interface with a post of the base portion.

6. The umbrella stand of claim 5, wherein a distance between the spring seat and the ball is adjustable by tightening or loosening the threaded interface between the socket sleeve and the post of the base portion.

7. An umbrella stand, comprising:
a receptacle for receiving a portion of a mast of an umbrella;
a base portion configured to interface with a ground surface; and
a movable joint disposed between and connected to the receptacle and to the base portion, the movable joint comprising:
a ball having a flat surface on one end thereof and a stem on an opposite end thereof;
a socket sleeve with a socket surface against which a surface of the ball bears;
a ball seat disposed within the socket sleeve and adjacent to the flat surface of the ball; and
a spring disposed within a socket sleeve and adjacent to the ball seat on a side of the ball seat opposite the ball.

8. The umbrella stand of claim 7, further comprising a spring seat disposed on a threaded post of the base portion.

9. The umbrella stand of claim 8, wherein the spring seat is formed integrally with the threaded post of the base portion.

10. The umbrella stand of claim 8, wherein the socket sleeve comprises a threaded bore into which the threaded post of the base portion is inserted.

11. The umbrella stand of claim 10, wherein threading the threaded bore of the socket sleeve and the threaded post of the base portion together by rotating the socket sleeve with respect to the base portion causes a distance between the spring seat and the ball to decrease.

12. The umbrella stand of claim 7, wherein the ball comprises a stem connected to the receptacle.

13. The umbrella stand of claim 7, wherein the base portion comprises a base plate carrying one or more stakes configured to be inserted into the ground surface.

14. An umbrella stand, comprising:
   a receptacle for receiving a portion of a mast of an umbrella;
   a base portion configured to interface with a ground surface; and
   a movable joint disposed between and connected to the receptacle and to the base portion, the movable joint comprising:
      a ball having a flat surface on one end thereof and a stem on an opposite end thereof;
      a socket sleeve with a socket surface against which a surface of the ball bears;
      a ball seat disposed within the socket sleeve and adjacent to the flat surface of the ball; and
      a spring disposed within a socket sleeve and adjacent to the ball seat on a side of the ball seat opposite the ball;
   further comprising a freestanding base with one or more sleeves into which one or more stakes of the base portion may be inserted and one or more spars extending away from the one or more sleeves.

15. The umbrella stand of claim 14, wherein the freestanding base includes one or more set screws to hold the one or more stakes within the one or more sleeves.

16. An umbrella stand, comprising:
   a receptacle for receiving at least a portion of a mast of an umbrella;
   a base portion for interfacing with a ground surface; and
   a movable joint disposed between the receptacle and the base portion, the movable joint comprising:
      a socket sleeve;
      a ball disposed at least partially within the socket sleeve and having a flat surface on one end thereof and a stem on an opposite end thereof;
      a ball seat disposed within the socket sleeve and adjacent to the flat surface of the ball; and
      a spring disposed within the socket sleeve and adjacent to the ball seat on a side of the ball seat opposite the ball.

* * * * *

UNITED STATES PATENT AND TRADEMARK OFFICE
CERTIFICATE OF CORRECTION

PATENT NO. : 9,644,385 B2
APPLICATION NO. : 15/018543
DATED : May 9, 2017
INVENTOR(S) : Hao Thu Ngu

It is certified that error appears in the above-identified patent and that said Letters Patent is hereby corrected as shown below:

In the Specification
    Column 2, Line 41, change "movable joint 119 may" to --movable joint 112 may--

Signed and Sealed this
Third Day of October, 2017

Joseph Matal
*Performing the Functions and Duties of the*
*Under Secretary of Commerce for Intellectual Property and*
*Director of the United States Patent and Trademark Office*